United States Patent

Ikeda et al.

Patent Number: 5,681,887
Date of Patent: Oct. 28, 1997

[54] METHOD OF STAMPING COMPOSITE SHEETS

[75] Inventors: Teruaki Ikeda; Tomio Akiyoshi, both of Yokkaichi, Japan

[73] Assignee: Idemitsu N.S.G. Co., Ltd., Yokkaichi, Japan

[21] Appl. No.: 678,117

[22] Filed: Jul. 11, 1996

Related U.S. Application Data

[63] Continuation of Ser. No. 430,267, Apr. 28, 1995, abandoned, which is a continuation of Ser. No. 216,175, Mar. 21, 1994, abandoned.

[30] Foreign Application Priority Data

Apr. 21, 1993 [JP] Japan ..................... 5-116612

[51] Int. Cl.$^6$ ................. C08J 5/10; C08K 3/40; C08L 23/10
[52] U.S. Cl. ........................ 524/494; 264/63
[58] Field of Search ...................... 544/492, 493, 544/494; 264/63

[56] References Cited

U.S. PATENT DOCUMENTS 4,044,188  8/1977  Segal ........................... 428/283

FOREIGN PATENT DOCUMENTS 2-51536  2/1990  Japan.

Primary Examiner—Paul R. Michl
Assistant Examiner—U. K. Rajguru
Attorney, Agent, or Firm—Frishauf, Holtz, Goodman, Langer & Chick, P.C.

[57] ABSTRACT

A method of stamping composite sheets to prepare a molding. The method including heating a plurality of composite sheets and stamping the heated composite sheets in a mold. Each composite sheet comprising a propylene-based resin and a glass fiber mixture. The glass fiber mixture includes short glass fibers and long glass fibers. The weight ratio of the short glass fibers to the long glass fibers in the glass fiber mixture is 2/1–1/2. The weight ratio of the propylene-based resin to the glass fiber mixture is 85/15–50/50. The melt index of the propylene-based resin in the composition making up the composite sheets is 20 g/10 minutes or greater. The resultant composite sheets can be easily handled during the molding process, and exhibit desirable mechanical strength. In addition, the glass fibers fill even the corners of the moldings, thus improving the strength of the edges, and provide uniform mold shrinkage factors, with a low occurrence of deformation and cracking. Furthermore, the resultant composite sheets have desirable shaping properties.

18 Claims, 1 Drawing Sheet

METHOD OF STAMPING COMPOSITE SHEETS

This application is a Continuation of application Ser. No. 08/430,267 filed Apr. 28, 1995 (abandoned), which is a continuation of application Ser. No. 08/216,175 filed Mar. 21, 1994 (abandoned).

FIELD OF THE INVENTION

The present invention relates to composite sheets for stamping, and particularly it relates to composite sheets for stamping which have good handling during stamping, and provide moldings which are filled to the edges with glass fibers and which have improved edge strengths and mold shrinkage factors.

DESCRIPTION OF THE PRIOR ART

Polypropylene resins containing glass fibers have excellent mechanical strength and rigidity, are lightweight, and have excellent physical properties such as chemical resistance, etc., and therefore they are useful as stamping materials for automobile parts, and the like.

However, these glass fibers consist primarily either of long fibers or short fibers.

Here, when long fibers are used excellent strength is provided, but there are problems of insufficient fluidity of the glass fibers, and inapplicability to the molding of certain precision parts such as flanges, ribs, bosses, and the like.

On the other hand, when short fibers are used the glass fibers have excellent fluidity, but they have inferior strength and there are also problems with their handling during molding. That is, in the case of stamping, there are problems of handling during production which include adhesion of the softened resin to gloves when heated composite sheets are loaded into molds manually and to "clamps" when they are loaded automatically.

SUMMARY OF THE INVENTION

The object of the present invention is to overcome these disadvantages of the prior art by providing composite sheets for stamping which have good handling during molding, and produce moldings which are filled to the edges with glass fibers and which have improved edge strengths and mold shrinkage factors, making it possible to obtain moldings with a low occurrence of warping and cracks.

DETAILED DESCRIPTION OF THE INVENTION

Figure 1:
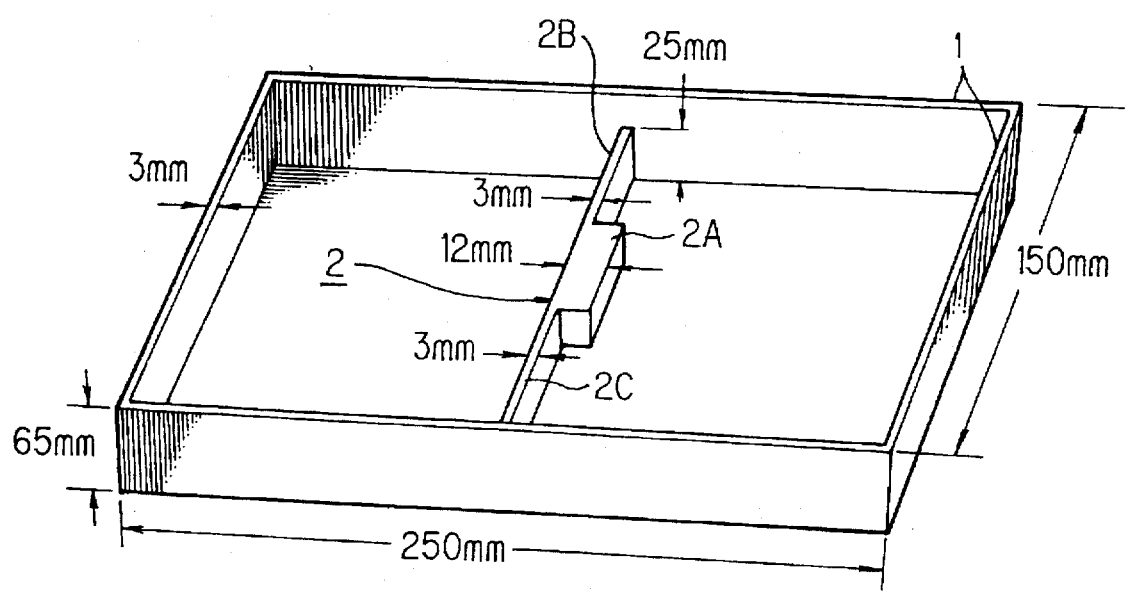
FIG. 1 is a perspective view showing an embodiment of a molding obtained by stamping of a composite sheet according to the present invention.

In summary, the present invention relates to composite sheets for stamping which comprise a propylene-based resin and a glass fiber mixture consisting of short glass fibers and long glass fibers, characterized in that (A) the ratio of the short glass fibers to the long glass fibers in the above mentioned glass fiber mixture is 2/1–1/2 (weight ratio), (B) the ratio of the above mentioned propylene-based resin to the above mentioned glass fiber mixture is 85/15–50/50 (weight ratio), and (C) the melt index of the propylene-based resin in the composition making up the composite sheets is 20 g/10 minutes or greater.

The propylene-based resin to be used according to the present invention may be, in addition to a propylene homopolymer, a copolymer of propylene and another olefin (for example, a copolymer of propylene and an $\alpha$-olefin of 2 or more carbon atoms, such as propylene/ethylene copolymer, and it may be a random copolymer or block copolymer), but propylene homopolymer is preferred.

According to the present invention, a small amount of another resin, for example, polyethylene, polystyrene, polyamide, polycarbonate, polyethylene terephthalate, polybutylene terephthalate, polyacetal, polyphenylene oxide, polyphenylene sulfide, polyvinyl chloride, etc. may be incorporated therein provided that the inherent rigidity and impact strength of the polypropylene is not particularly lowered.

Also, an inorganic filler such as calcium carbonate, talc, precipitated barium sulfate, etc., an organic filler such as melamine resin powder, etc. or various additives for other purposes such as frame-retardant and ultraviolet-absorber may be appropriately added thereto if necessary.

The composite sheets of the present invention include short glass fibers and long glass fibers in a specified ratio.

Here, the short glass fibers have an average fiber length of 7 mm or less, and preferably 3–0.1 mm, and more preferably 2–0.2 mm. An average fiber length in excess of 7 mm is not preferred because the glass fibers will not easily flow into the corners or edges of the mold.

On the other hand, if the fiber length is too short, then sufficient strength will not be exhibited, and therefore the lower limit is preferably 0.1 mm, and more preferably 0.2 mm.

In addition, the long glass fibers have an average-fiber length of 8 mm or greater, and preferably 30–60 mm. An average fiber length of less than 8 mm is not preferred because it will lower the impact strength.

The long glass fibers in the composite sheets is described above.

Next, the long glass fibers material used in production of the composite sheets is described below.

The long glass fibers material may be at random (non-aligned), or not aligned in any particular direction, but they are more suitable if aligned in one direction. The form of such glass fibers material is not particularly restricted, and a variety of forms may be employed. As examples may be mentioned mat, cross, chopped strand, needle-punching mat and other forms, and particularly suitable is a needle-punching mat which is obtained by needle-punching a continuous glass fiber mat.

The diameter of both the long and the short glass fibers material is not always restricted and is preferably 9–25 μm. A diameter of the glass fibers in excess of 25 μm is not preferred because it will lower the tensile strength.

The quality of such glass fibers material is not particularly restricted and may be non-alkaline glass, low-alkaline glass or alkaline glass, and conventionally employed glass fibers of various compositions may be used.

As described above, the present invention relates to composite sheets comprising a propylene resin and glass fibers, providing that the above mentioned conditions (A)–(C) are met.

In other words, first (A) the ratio of the short glass fibers to long glass fibers in the above mentioned glass fibers of the composite sheets must be 2/1–1/2 (weight ratio), and preferably 5/3–3/5 (weight ratio).

Here, a ratio of short glass fibers to long glass fibers in excess of 2/1 is not desirable because the cohesion of the plasticized composite sheets during stamping (particularly at picking up the hot blank) will be increased and the resin will adhere to the operating equipment and worker's gloves, thus complicating handling during processing, and in addition the impact strength of the molding will be considerably reduced.

On the other hand, a ratio of short glass fibers to long glass fibers of less than 1/2 is not desirable because the glass fibers will not fill the corners of complicated shapes having many narrow rib sections when such are used for molding, and this will lower the strength of the corners and edges, creating differences in the mold shrinkage factors of the various sections, and thus resulting in the occurrence of warping and cracks.

Next, (B) the ratio of the above mentioned propylene-based resin to the above mentioned glass fibers must be 85/15–50/50 (weight ratio), and preferably 80/20–60/40 (weight ratio), and more preferably 70/30–60/40 (weight ratio).

Here, a propylene-based resin content of over 85 wt %, that is, a glass fiber content of less than 15 wt %, will lead to insufficient mechanical properties, such as rigidity, of the molding, while on the other hand a propylene-based resin content of less than 50 wt %, that is, a glass fiber content of greater than 50 wt %, will make shaping during stamping difficult, and therefore neither is desirable.

Furthermore, according to the present invention, (C) the melt index of the propylene-based resin in the composition making up the composite sheets must be 20 g/10 minutes or greater, and preferably 25 g/10 minutes or greater. If the melt index of the propylene-based resin in the composition making up the composite sheets is less than 20 g/10 minutes, then the penetration of the propylene-based resin into the glass fibers during production of the composite sheets will be insufficient, which will impair the shaping and the filling of the glass fibers into the corners during stamping, and therefore it is not desirable.

Here, the melt index of the propylene-based resin in the composition making up the composite sheets is not the melt index of the propylene-based resin starting material, but rather the melt index of the propylene-based resin in the composition, i.e., the melt index of the propylene-based resin alone after the glass fibers have been separated and removed from the composition. This melt index of the propylene-based resin in the composition making up the composite sheets may be easily determined by, for example, the method described hereafter in the Examples.

If the melt index is about 300 g/10 minutes or greater, then inconveniences will result such as dripping of the propylene-based resin during the production of the composite sheets and, even if the composite sheets can be produced, dripping of the propylene resin during the stamping.

The composite sheets for stamping according to the present invention are prepared using the above mentioned components in accordance with the above conditions (A)–(C).

To make the composite sheets, the above mentioned components may simply be mixed together and sheeted using an extruder or the like, but usually they may be produced by a method which combines sheets such as, for example, the one described below.

That is, the propylene-based resin and the short glass fibers (including additives as set forth hereinbefore in the fourth paragraph of the Detailed Description of the Invention, if desired) may be put into the extruder for extrusion to obtain resin sheets. Long glass fibers (for example, a long glass fiber mat, etc.) are used to sandwich the two outer sides of the resin sheets each containing one extruded layer of short glass fibers. Then propylene-based resin sheets are used to sandwich the two outer sides the long glass fibers. Thereafter, heat and pressure are applied thereto using a laminator to obtain a composite sheet.

Alternatively, first the propylene-based resin and the short glass fibers may be put into the extruder for extrusion to obtain resin sheets containing the extruded layer of short glass fibers which sandwich the long glass fibers (for example, a long glass fiber mat, etc.) at the two external sides thereof. Then heat and pressure are applied thereto using a laminator to obtain a composite sheet.

The thickness of the composite sheets is normally 1–10 mm, and preferably 2–5 mm. If the thickness of the composite sheets is less than 1 mm, their production will be difficult. On the other hand, a thickness of the composite sheets in excess of 10 mm is undesirable because preheating for the stamping will become difficult.

When the composite sheets obtained in this manner are molded into a suitable form by stamping, the glass fibers fill even the corners of the mold, and as a result moldings may be obtained which have improved edge strengths and uniform mold shrinkage factors, with low occurrence of deformation and cracking. In addition, cohesion of the plasticized composite sheets during stamping (particularly at picking up the hot blank) is not increased very much, and there are no difficulties such as complicated handling during processing due to adherence of the resin to the operating equipment and worker's gloves.

The, reason, in detail, for the lack of occurrence of cracks in the rib sections (corners of the molding) according to the present invention is that the glass fibers fill in even the terminal sections of the mold, and thus difference of the mold shrinkage factors is small between the edges of the molding of the long glass fiber-filled terminal sections or sections, and the occurrence of cracking is prevented. According to the prior art, the filling of the glass fibers to the terminal sections of the molding is not sufficient, and cracking occurs.

EXAMPLES

The present invention is described in greater detail with reference to the following examples although it is not intended to be limited thereto.

Examples 1–4 and Comparative Examples 1–6

A propylene resin (propylene homopolymer, density: 0.91 g/cm$^3$) and glass fibers with an average fiber length of 0.3 mm, combined together at a prescribed ratio were placed in an extruder for extrusion to produce two resin sheets each containing an extruded layer of short glass fibers. A prescribed amount of a needle-punching mat layer consisting of long glass fibers with an average fiber length of 50 mm (diameter: 23 μm) was used to sandwich the two resin sheets containing an extruded layer of short glass fibers at the two outer sides thereof. In the same manner as above, a propylene resin sheet was used to sandwich the long glass fibers at the two outer sides thereof. Pressure and heat were applied at 3 kg/cm$^2$, 230° C. for 5 minutes using a laminator to impregnate the glass fiber layer with the propylene resin, and the sheet was then cooled to obtain a composite sheet.

The short glass fibers of the composite sheets had an average fiber length of about 0.3 mm. The long glass fibers of the composite sheets had an average fiber length of about 50 mm.

For each sample, (A) the ratio of the short glass fibers to the long glass fibers in the above mentioned glass fibers, (B) the ratio of the above mentioned propylene resin to the above mentioned glass fibers and (C) the melt index (MI) of the propylene resin in the composition making up the composite sheets, are as shown in Table 1.

The physical properties of the obtained composite sheets are shown in Table 1.

Furthermore, each of the obtained composite sheets was subjected to stamping under the same conditions (the stamping was carried out according to the conditions set forth in note 9 for Table 1 hereinbelow), to prepare moldings (width: 250 mm, length: 150 mm, height: 65 mm, thickness of peripheral wall 1: 3 mm) in the shape shown in FIG. 1.

Using the obtained moldings, measurement was made of the flexural strength of the wide rib section 2A (a section 12 mm in width; length: 50 mm, height: 25 mm) of the rib 2 (height: 25 mm) constructed at the inside middle of rib 2, and the occurrence of cracking by shrinkage upon molding was observed. In addition, a specimen was cut off from the narrow rib section 2B (width: 3 mm, length: 50 mm, height: 25 mm; a section placed in contact with the bottom having been chamfered to a radius of 3 mm) of the rib 2, and the filling percentage of the glass fibers was measured. The results are shown in Table 1. In the figure, "2C" indicates the other narrow rib section of the rib 2, with a width of 3 mm and a length of 50 mm, and with the side in contact with the bottom having been chamfered to a radius of 5 mm).

TABLE 1

|  | Ex.1 | Co. Ex.1 | Ex.2 | Co. Ex.2 | Co. Ex.3 |
|---|---|---|---|---|---|
| Propylene-based resin (wt %) | 60 | 60 | 70 | 70 | 70 |
| Glass fiber (wt %) |  |  |  |  |  |
| Short fibers | 20 | 5 | 15 | 15 | 5 |
| Long fibers | 20 | 35 | 15 | 15 | 25 |
| MI of propylene-based resin in resin composition ‡1 | 30 | 25 | 25 | 15 | 25 |
| Tensile strength (kg/cm²) ‡2 | 870 | 750 | 700 | 700 | 650 |
| Flexural strength (kg/cm²) ‡3 | 1500 | 1350 | 1200 | 1190 | 1100 |
| Flexural modulus (kg/cm²) ‡4 | 52000 | 50000 | 42000 | 41000 | 42000 |
| Izod impact strength (kg · cm/cm) ‡5 | 72 | 85 | 45 | 47 | 55 |
| Filling percentage of glass fiber in rib 2B (%) ‡6 | 95 | 48 | 90 | 90 | 45 |
| Flexural strength of rib 2A (kg/cm²) ‡7 | 1400 | 1000 | 950 | 900 | 800 |
| Occurrence of cracking in rib 2A (%) ‡8 | 0 | 30 | 0 | 0 | 20 |
| Shaping percentage (%) ‡9 | 100 | 100 | 100 | 50 | 100 |

|  | Co. Ex.4 | Co. Ex.5 | Ex.3 | Co. Ex.6 | Ex.4 |
|---|---|---|---|---|---|
| Propylene-based resin (wt %) | 60 | 40 | 60 | 90 | 60 |
| Glass fiber (wt %) |  |  |  |  |  |
| Short fibers | 20 | 30 | 25 | 5 | 15 |
| Long fibers | 20 | 30 | 15 | 5 | 25 |
| MI of propylene-based resin in resin composition ‡1 | 15 | 35 | 30 | 30 | 30 |
| Tensile strength (kg/cm²) ‡2 | 860 | 950 | 880 | 400 | 870 |
| Flexural strength (kg/cm²) ‡3 | 1450 | 2000 | 1450 | 700 | 1550 |
| Flexural modulus (kg/cm²) ‡4 | 51500 | 65000 | 53000 | 25000 | 52000 |
| Izod impact strength (kg · cm/cm) ‡5 | 75 | 100 | 65 | 11 | 80 |
| Filling percentage of glass fiber in rib 2B (%) ‡6 | 90 | No fluidity into rib;unmeasurable | 100 | 100 | 80 |
| Flexural strength of rib 2A (kg/cm²) ‡7 | 1300 |  | 1400 | 600 | 1200 |
| Occurrence of cracking in rib 2A (%) ‡8 | 0 |  | 0 | 0 | 0 |
| Shaping percentage (%) ‡9 | 20 | 0 | 100 | 100 | 100 |

(Notes for Table 1)
‡1: The melt index (MI) of the propylene resin in the composition making up the composite sheet was determined in the following manner. That is, the composite sheet was placed in a filter heated to 230° C. and kept under a nitrogen atmosphere, pressure was applied from above for the filtering through 5 layers of 0.5 mm mesh to remove the glass fibers, after which the MI of the remaining propylene resin was determined by a conventional method.
‡2: According to ASTM D 638
‡3: According to ASTM D 790
‡4: According to ASTM D 790
‡5: According to ASTM D 256 (notched)
‡6: The narrow rib section 2B (25 mm × 50 mm × 3 mm) was cut off as a specimen, and this was incinerated, and the result expressed as a proportion of the cross-sectional area of the glass fiber-filled section which appears as a shaded area to the entire cross-sectional area. The values in the table are the average values of 10 samples.
Filling percentage (%) = (cross-sectional area of glass fiber-filled section/ entire cross-sectional area) × 100
‡7: A 12 mm-thick section of the rib 2 was cut to include a length of 50 mm and a height of 10 mm, and the flexural strength thereof was measured based on ASTM D 790.
‡8: After stamping, the moldings were allowed to stand for 24 hours, and the minute cracks which formed in the rib 2 were observed and the evaluation was made based on 10 samples according to the following equation.
Occurrence of cracking (%) = (samples on which minute cracks were observed /10) × 100
‡9: Using a mold of width 290 mm, length 170 mm and thickness 65 mm, 3 composite sheets (width: 210 mm, depth: 125 mm, thickness: 3.8 mm) were piled together and molded by stamping under conditions of a blank heating temperature of 230–250° C., an upper mold temperature of 50–60° C., a lower mold temperature of 30–45° C., a pressure of 140 kg/cm² and a pressing time of 20 seconds, to obtain square container-shaped moldings. The shaping percentages in the table were found based on 10 samples using the following equation, and were expressed as proportions of the totally shaped moldings.
Shaping percentage (%) = (molding which were totally shaped completely /10) × 100

As mentioned above, the composite sheets according to the present invention, when subjected to stamping, are easily handled during molding, and there are no problems such as, for example, adhesion of the softened resin to gloves when the heated composite sheets are loaded into molds manually or to "clamps" when they are loaded automatically.

Furthermore, the composite sheets according to the present invention exhibit excellent mechanical strength, and are equivalent to sheets containing only long glass fibers.

Moreover, the glass fibers of the composite sheets according to the present invention fill even the corners of moldings when they undergo stamping, and as a result the strength of the edges is improved, and the mold shrinkage factors are uniform, making it possible to obtain moldings with a low occurrence of deformities and cracks.

In addition, the composite sheets according to the present invention have excellent shaping properties.

Thus, the composite sheets according to the present invention may be effectively used particularly as materials for stamping.

What is claimed is:

1. In an improved method of stamping composite sheets to prepare a molding, comprising heating a plurality of composite sheets and stamping the heated composite sheets in a mold, the improvement wherein each composite sheet comprises a propylene-containing resin and a glass fiber mixture, said glass fiber mixture comprising short glass fibers having an average fiber length of 3 to 0.1 mm and long glass fibers having an average fiber length of 30 to 60 mm, the weight ratio of the short glass fibers to the long glass fibers in said glass fiber mixture being 5/3–1/2, the weight ratio of said propylene-containing resin to said glass fiber mixture being 85/15–50/50, and the melt index of the propylene-containing resin being 20 g/10 minutes to not more than 300 g/10 minutes.

2. The composite sheets for stamping as claimed in claim 1, wherein the propylene-based resin is propylene homopolymer.

3. The composite sheets for stamping as claimed in claim 1, wherein the short glass fibers have an average fiber length of 7 mm or less.

4. The composite sheets for stamping as claimed in claim 1, wherein the long glass fibers have an average fiber length of 8 mm or greater.

5. The composite sheets for stamping as claimed in claim 1, wherein the ratio of the short glass fibers to the long glass fibers in the glass fiber mixture is 5/3–3/5 (weight ratio).

6. The composite sheets for stamping as claimed in claim 1, wherein the ratio of the propylene-based resin to the glass fiber mixture is 80/20–60/40 (weight ratio).

7. The composite sheets for stamping as claimed in claim 1, wherein the melt index of the propylene-based resin in the composition making up the composite sheets is 25 g/10 minutes or greater.

8. The composite sheets for stamping as claimed in claim 1, wherein the composite sheet have a thickness of 1–10 mm.

9. The method for stamping as claimed in claim 1, wherein the short glass fibers have an average fiber length of 7 mm or less and the long glass fibers have an average fiber length of 8 mm or greater.

10. The method for stamping as claimed in claim 9, wherein the melt index of the propylene-containing resin is 25 g/10 minutes or greater.

11. The method for stamping as claimed in claim 7, wherein melt index of the propylene-containing resin is 25 to 300 g/10 minutes.

12. The method for stamping as claimed in claim 11, wherein the short glass fibers have an average fiber length of 2 to 0.2 mm.

13. The method for stamping as claimed in claim 11, wherein the short glass fibers and the long glass fibers each have a diameter of 9 to 25 μm.

14. The method for stamping as claimed in claim 13, wherein the composite sheets have a thickness of 2 to 5 mm.

15. The method for stamping as claimed in claim 14, wherein the weight ratio of the propylene-containing resin to the glass fiber mixture is 70/30 to 60/40.

16. The method for stamping as claimed in claim 1, wherein the composite sheets for stamping comprise layers of the long glass fibers which sandwich a layer of the short glass fibers and propylene-containing resin sheets which sandwich the long glass fibers.

17. The method for stamping as claimed in claim 1, wherein the composite sheets for stamping comprise layers including the propylene-based resin and the short glass fibers which sandwich a layer of the long glass fibers.

18. The method for stamping as claimed in claim 1, wherein the short glass fibers have an average fiber length of 0.3 mm.

* * * * *

UNITED STATES PATENT AND TRADEMARK OFFICE
CERTIFICATE OF CORRECTION

PATENT NO. : 5,681,887
DATED : October 28, 1997
INVENTOR(S) : Ikeda et al

It is certified that error appears in the above-identified patent and that said Letters Patent is hereby corrected as shown below:

```
Column 7, (Claim 2) line 19: delete "composite sheets"
and insert --method--;
                     line 20: delete "based" and insert
--containing--.
Column 7, (Claim 3) line 22: delete "composite sheets"
and insert --method--.
Column 7, (Claim 4) line 25: delete "composite sheets"
and insert --method--.
Column 7, (Claim 5) line 28: delete "composite sheets"
and insert --method--;
                     line 29: before "ratio" insert
--weight--;
                     line 30: delete "(weight ratio)".
Column 7, (Claim 6) line 31: delete "composite sheets"
and insert --method--;
                     line 32: before "ratio" insert
--weight--;
                     line 33: delete "(weight ratio)".
```

UNITED STATES PATENT AND TRADEMARK OFFICE
CERTIFICATE OF CORRECTION

PATENT NO. : 5,681,887
DATED : October 28, 1997
INVENTOR(S) : Ikeda et al       Page 2 of 2

It is certified that error appears in the above-identified patent and that said Letters Patent is hereby corrected as shown below:

Column 7, (Claim 7) line 34: delete "composite sheets" and insert --method--;
line 35: after "propylene-" delete "based" and insert --containing--;
lines 35 & 36: delete "in the composition making up the composite sheets".
Column 8, (Claim 8) line 1: delete "composite sheets" and insert --method--;
line 2: delete "sheet" and insert --sheets--.

Signed and Sealed this

Twelfth Day of September, 2000

Attest:

Q. TODD DICKINSON

*Attesting Officer*          *Director of Patents and Trademarks*